G. E. MILLER.
LOCK NUT.
APPLICATION FILED MAY 5, 1920.
1,371,639.  Patented Mar. 15, 1921.
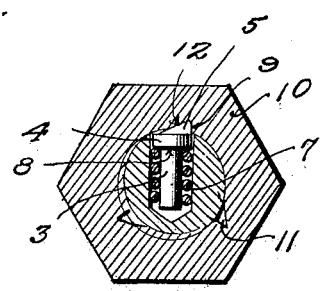
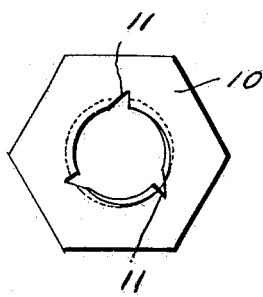
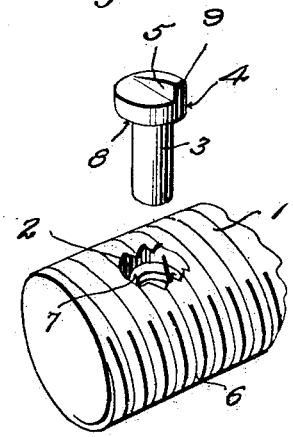
George E. Miller INVENTOR.
Witness
BY
his ATTORNEY.

UNITED STATES PATENT OFFICE.

GEORGE E. MILLER, OF MEADVILLE, PENNSYLVANIA, ASSIGNOR OF ONE-HALF TO RANSOM H. MILLER, OF MEADVILLE, PENNSYLVANIA.

LOCK-NUT.

1,371,639.  Specification of Letters Patent.  Patented Mar. 15, 1921.

Application filed May 5, 1920. Serial No. 379,040.

*To all whom it may concern:*

Be it known that I, GEORGE E. MILLER, a citizen of the United States, residing at Meadville, in the county of Crawford and State of Pennsylvania, have invented certain new and useful Improvements in Lock-Nuts, of which the following is a specification.

This invention relates to nut and bolt locks and has for its object the production of a simple and efficient locking means whereby the nut may be easily threaded upon the bolt and after being adjusted to the desired position, will be firmly locked against unthreading from the bolt.

Another object of the invention is the production of a simple and efficient nut and bolt lock, wherein the nut is provided with a spring pressed locking pawl or dog for engaging the nut and firmly holding the nut against accidental removal from the bolt.

Other objects and advantages of the present invention will appear throughout the following specification and claim.

In the drawing:—

Figure 1 is a transverse section through the nut and bolt showing the locking pawl in elevation, Fig. 2 is a plan view of one face of the nut, and, Fig. 3 is a fragmentary disassembled perspective view of one end of the bolt showing the locking pawl removed from engagement with the bolt, the receiving socket for the pawl or dog being clearly shown.

By referring to the drawings, it will be seen that 1 designates the threaded bolt which is provided with a transversely extending pocket 2 formed in one side thereof, within which pocket 2 fits the pawl or dog 3. The pawl 3 is provided with an enlarged head 4 having a cam outer face for producing a locking lip or shoulder 5 to conform with the cutting of the threads 6 formed upon the bolt 1. A coil spring 7 is mounted within the pocket 2 and fits snugly around the shank of the pawl 3 as clearly shown in Fig. 1, the coil spring engaging the lower end of the pocket 2 and also engaging the lower face 8 of the pawl 3 as clearly shown in Fig. 1 of the drawing. By considering Figs. 1 and 3 of the drawing, it will be seen that by producing the shoulder 5, the vertically extending notch engaging face 9 is produced upon the pawl 3.

A nut 10 is adapted to be threaded upon the threads 6 and this nut 10 is provided with internal threads and suitable substantial V-shaped notches 11 are formed upon the inner threaded face of the nut 10 as clearly shown in Fig. 1 for the purpose of the straight nut engaging face 9 of the head 4 of the pawl 3. The spring 7 will normally urge the pawl 3 outwardly or into engagement with the notches 11 formed in the nut 10 as will be obvious by considering Fig. 1.

From the foregoing description, it will be seen that a very simple and efficient means has been produced for locking the nut upon the bolt and due to the spring pressed pawl 3, it will be seen that the nut 10 may be readily threaded upon the bolt 6 without interference but should the nut 10 tend to unthread from the bolt 6, the pawl 3 will readily engage one of the notches 11 formed in the nut and in this way firmly hold the nut against accidental displacement from the bolt. As shown in Fig. 1, one face 12 of the upper head portion 4 of the pawl 3 is inclined to permit the nut 10 to be easily threaded upon the bolt 6.

I claim:—

In combination with a threaded bolt provided with a socket formed in one side thereof of uniform diameter throughout its entire length, the socket extending transversely of the central axis of the bolt, and projecting into the bolt for substantially the entire width thereof and terminating short of one side of the bolt, a pawl slidably mounted within said socket and provided with a reduced shank, a spring mounted upon said shank, said pawl provided with an enlarged head engageable by said spring for normally urging said pawl outwardly with respect to said socket, said pawl provided with a substantially spiral outer face having an abrupt vertical abutment portion, and a nut adapted to be threaded upon said bolt and having substantially V shaped notches formed in the inner face thereof said notches projecting beyond the thread formed in the nut and said notches adapted to receive said abutment shoulder of said pawl.

In testimony whereof I affix my signature in presence of two witnesses.

GEORGE E. MILLER.

Witnesses:
CHAS. C. JONES,
M. C. CLARK.